US011416231B1

(12) United States Patent
Malaspina et al.

(10) Patent No.: US 11,416,231 B1
(45) Date of Patent: Aug. 16, 2022

(54) INCOMPATIBILITY NOTIFICATION AND OPTIMAL COMPATIBLE SOLUTION

(71) Applicant: Rockwell Automation Technologies, Inc., Mayfield Heights, OH (US)

(72) Inventors: Fabio Malaspina, Twinsburg, OH (US); James A. Bizily, Willoughby, OH (US); Chunhui Zhu, Dalian (CN); Yuan Wei, Dalian (CN); Jingfeng Chen, Dalian (CN); Emily J. Smith, Willowick, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/226,821

(22) Filed: Apr. 9, 2021

(51) Int. Cl.
*G06F 8/61* (2018.01)
*G05B 19/4155* (2006.01)
*G06F 8/71* (2018.01)

(52) U.S. Cl.
CPC .......... *G06F 8/61* (2013.01); *G05B 19/4155* (2013.01); *G06F 8/71* (2013.01); *G05B 2219/31418* (2013.01)

(58) Field of Classification Search
USPC ........................................................ 717/175
See application file for complete search history.

(56) References Cited

U.S. PATENT DOCUMENTS

2020/0064819 A1* 2/2020 Fisher ............... G05B 19/41855
2020/0356354 A1* 11/2020 Mitra ........................ G06F 8/65

* cited by examiner

*Primary Examiner* — John Q Chavis
(74) *Attorney, Agent, or Firm* — Fletcher Yoder, P.C.

(57) ABSTRACT

The present disclosure relates generally to systems and methods for providing sets of compatible firmware versions (e.g., cross-compatibility solution) for flashing (e.g., programming or re-programming) different devices of a network of devices (e.g., an industrial automation system) when using a flashing application. Providing the compatible firmware versions of such network of devices may facilitate flashing the devices with compatible firmware, based on a topology of the network of devices, to prevent functional errors in the network of devices. The present systems and methods may also be applicable to determining and providing cross-compatibility solution between different firmware, as well as software, used by different devices of a network of devices. That said, although embodiments described herein are with respect to providing sets of compatible firmware versions for firmware associated with devices of a network, it should be appreciated that similar systems and methods may provide sets of compatible software versions associated with various devices of a network.

20 Claims, 7 Drawing Sheets

INCOMPATIBILITY NOTIFICATION AND OPTIMAL COMPATIBLE SOLUTION

BACKGROUND

This disclosure relates generally to systems and methods for facilitating successful communication between devices of a network. More particularly, embodiments of the present disclosure are directed toward indicating compatibility (or incompatibility) of different available versions of firmware associated with different devices within a network to avoid errors after programming the devices (e.g., programming one or more devices with incompatible firmware versions).

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Industrial automation systems may include multiple devices arranged and connected to form a network. The devices may be communicatively coupled to one another and functionally co-dependent to perform different operations of the industrial automation system. Such devices may include configurable circuitry that may be programmed (e.g., "flashed") using specific firmware or software. A computing device associated with the industrial automation system may flash the different devices, which may be disposed behind a firewall, with the specific firmware. Moreover, each specific firmware associated with each device may correspond to one of multiple available versions of the firmware. However, some firmware versions for a first device may not be compatible with one or multiple other firmware versions for one or multiple other devices within the network. For example, some combinations of firmware versions may be functionally or communicatively incompatible, which may lead to functional errors in the operations of the industrial automation system. It may be time and/or resource intensive to identify a combination of firmware versions for respective devices within a network that are compatible. Accordingly, improved techniques for identifying compatible combinations of firmware versions and installing those firmware versions on the devices on the network may prevent functional errors and reduce time and resources expended troubleshooting the network.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, an industrial automation control system is described. The industrial automation system may include a processing component that may communicatively couple to multiple automation devices. The processing component may receive automation device information identifying multiple firmware versions available to run on each of the automation devices. Moreover, the processing component may receive firmware compatibility information indicative of compatibility between the multiple available firmware versions. The processing circuitry may also determine one or more sets of compatible firmware versions based on the firmware compatibility information. Each of the one or more sets of compatible firmware versions may include at least one respective firmware version that may run on each of the automation devices while remaining compatible with each other. The processing circuitry may then present, via a graphical user interface (GUI), an indication of at least one of the one or more sets of compatible firmware versions. Subsequently, the processing circuitry may receive, via the GUI, an input indicative of a selection of a particular set of the one or more sets of compatible firmware versions and provide a command to install the respective firmware version from the selected set of compatible firmware versions to each of the plurality of automation devices.

In another embodiment, a non-transitory computer readable medium may include computer readable code executable by one or more processors to perform instructions. Upon execution of the computer readable code, the processors may receive automation device information for multiple automation devices of an industrial automation system that may identify multiple firmware versions available to run on each of the plurality of automation devices. The processors may receive device topology information indicative of one or more functional relationships between two or more of the multiple automation devices. The processors may then receive firmware compatibility information indicative of compatibility between the available firmware versions. The processing circuitry may then determine one or more sets of compatible firmware versions based on the firmware compatibility information and the device topology information, where each of the one or more sets of compatible firmware versions may include at least one respective firmware version to run on each of the plurality of automation devices while remaining compatible with each other. Subsequently, the processors may present an indication of at least one of the one or more sets of compatible firmware versions and receive an input indicative of a selection of a particular set of the one or more sets of firmware versions via a graphical user interface (GUI). Accordingly, the processors may provide a command to install the respective firmware version from the selected set of compatible firmware versions to each of the automation devices.

In yet another embodiment, a method of operation of an industrial automation system is described. The method may start by receiving automation device information identifying multiple firmware versions available to run on each of the automation devices by processing circuitry communicatively coupled to a plurality of automation devices. The processing circuitry may receive firmware compatibility information indicative of compatibility between the available firmware versions. Subsequently, the processing circuitry may receive a selection of a particular available firmware version of the available firmware versions for a particular automation device. The processing circuitry may determine one or more sets of compatible firmware versions based on the firmware compatibility information and the selected particular firmware version for the particular automation device. Each of the one or more sets of compatible firmware versions may comprise at least one respective firmware version to run on each of the automation devices while remaining compatible with each other. Subsequently, the processing circuitry may present an indication of at least one of the one or more sets of compatible firmware versions and also receive an input indicative of a selection of a particular set of the one or more sets of compatible firmware versions via a graphical user interface (GUI). Accordingly, the processing circuitry may provide a command to install the respective firmware version from the selected set of compatible firmware versions to each of the plurality of automation devices.

DRAWINGS

These and other features, aspects, and advantages of the embodiments described in the present disclosure will become better understood when the following detailed description is read with reference to the accompanying drawings in which like characters represent like parts throughout the drawings, wherein.

Figure 3:
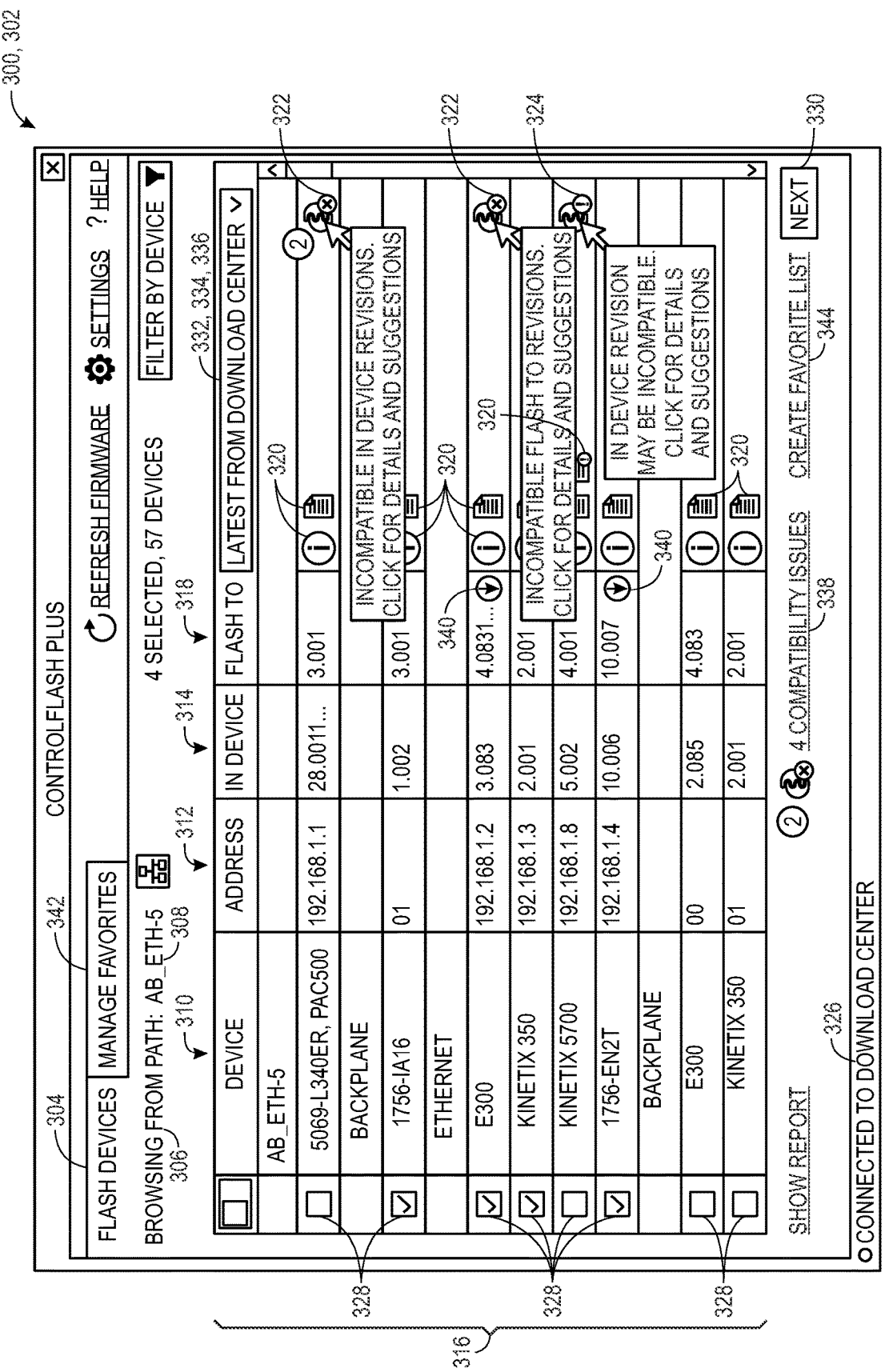
FIG. 3 illustrates a graphical user interface (GUI) for a flashing application that may determine cross-compatibility information of devices of the industrial automation system of FIG. 2, in accordance with an embodiment presented herein.
Figure 4:
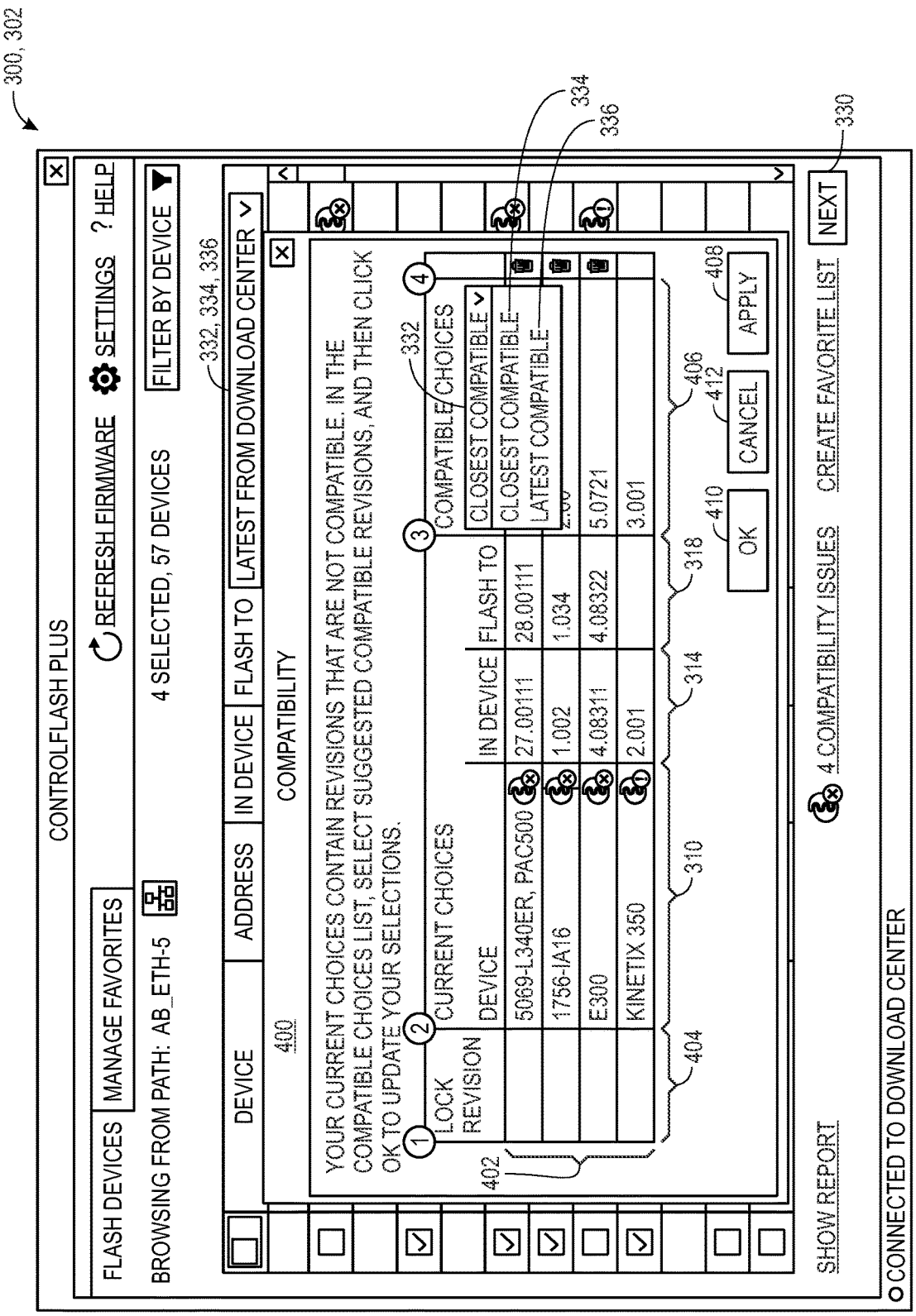
FIG. 4 illustrates a compatibility window GUI for providing compatible suggested flashing firmware versions associated with the flashing application of FIG. 3, in accordance with an embodiment presented herein.
Figure 5A:
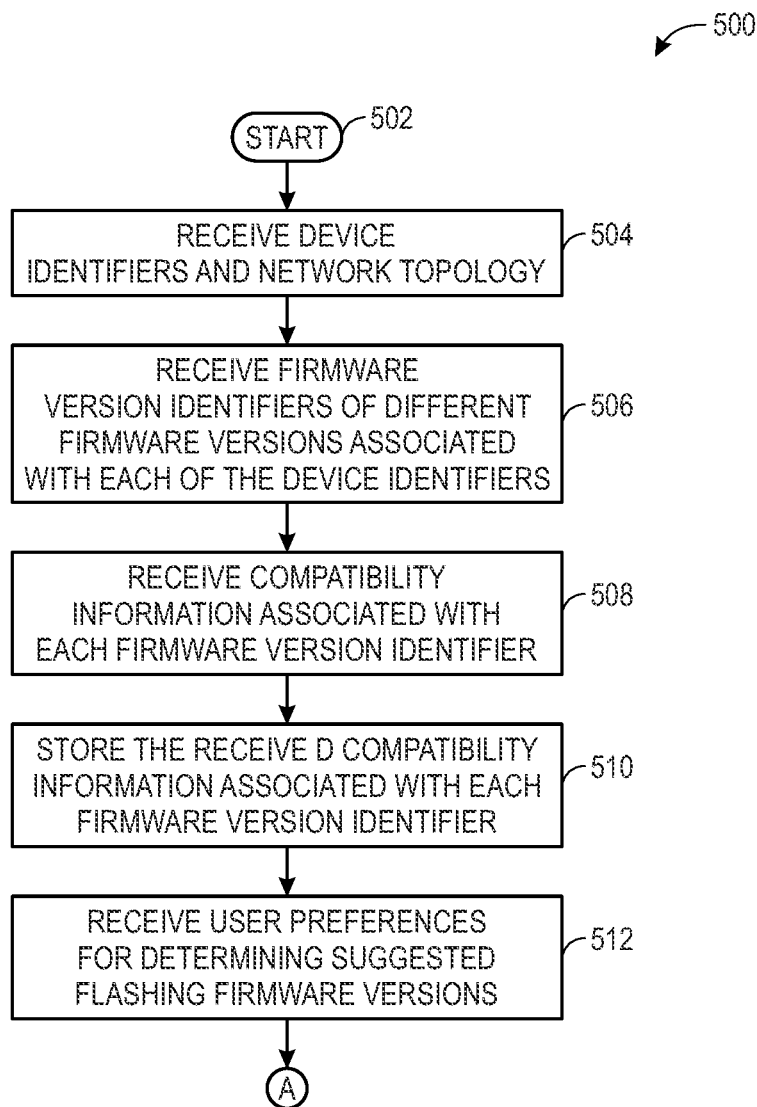
Figure 5B:
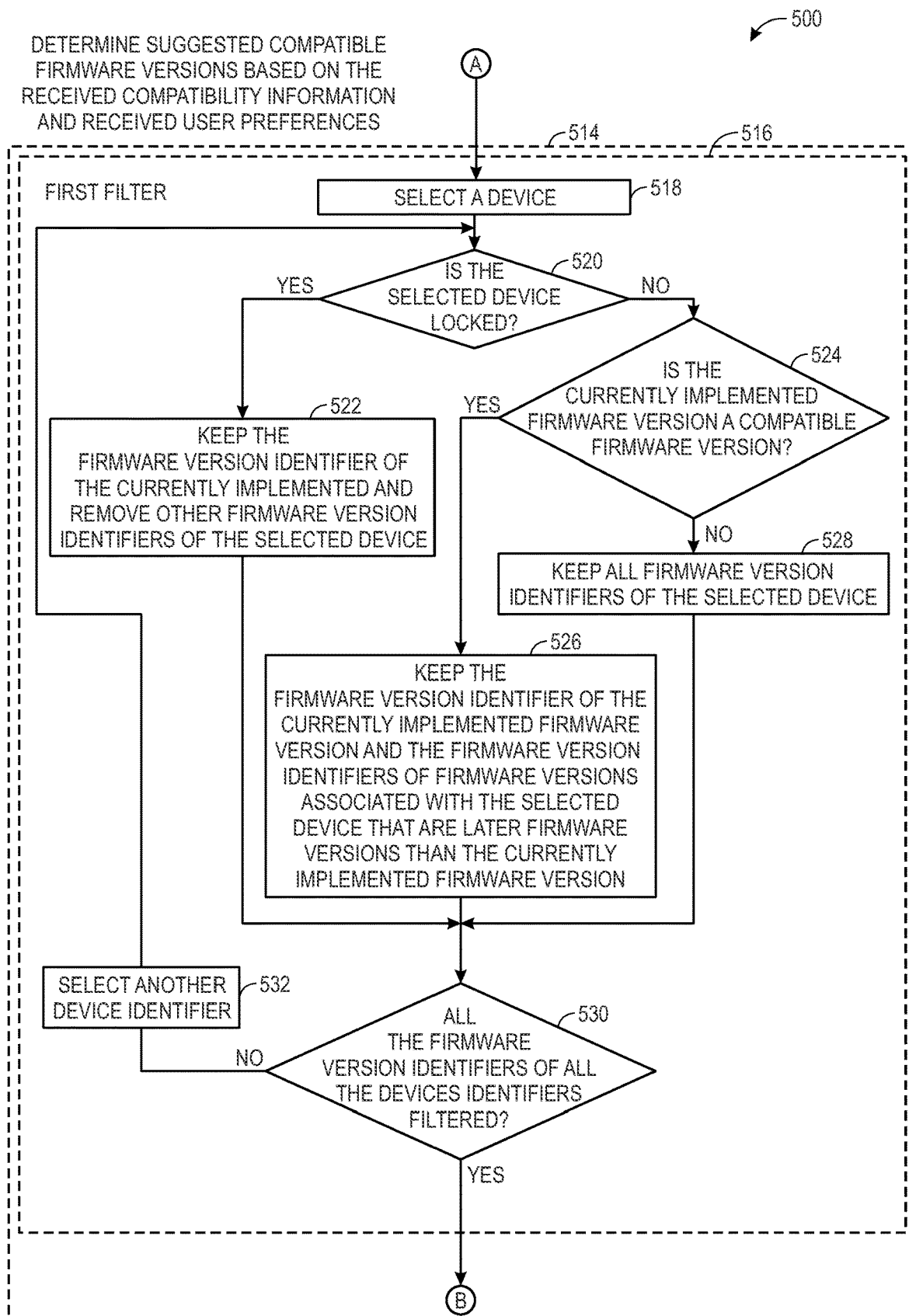
Figure 5C:
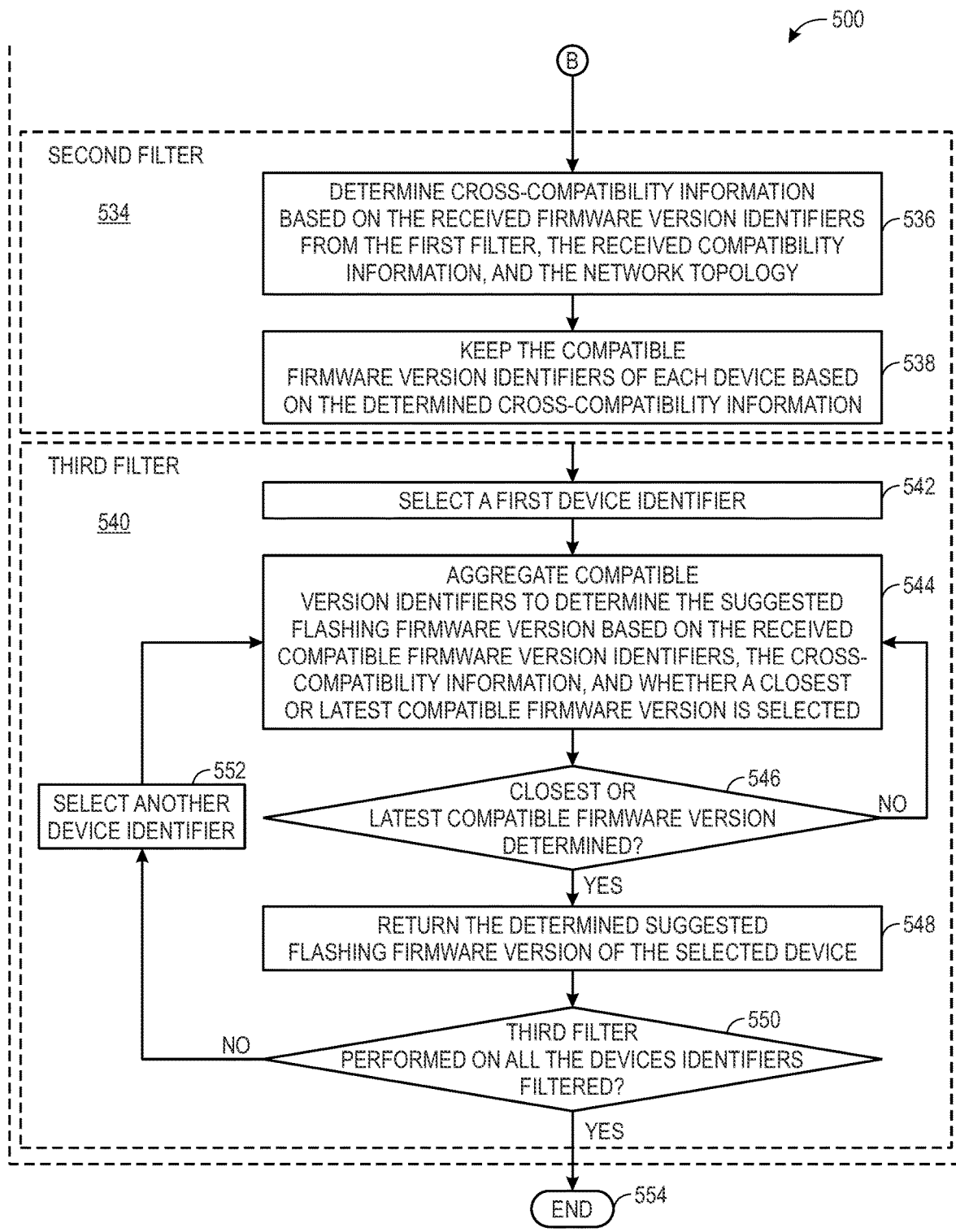

FIG. 5A is a first portion of a flow chart of a process for determining the cross-compatibility information of the firmware associated with the devices of a network and providing the suggested flashing firmware versions that may be employed by the flashing application of FIGS. 3 and 4, in accordance with an embodiment presented herein; and FIG. 5B is a second portion of the flow chart of FIG. 5A of the process for determining the cross-compatibility information of the firmware associated with the devices of the network and providing the suggested flashing firmware versions that may be employed by the flashing application of FIGS. 3 and 4, in accordance with an embodiment presented herein;

FIG. 5C is a third portion of the flow chart of FIGS. 5A and 5B of the process for determining the cross-compatibility information of the firmware associated with the devices of the network and providing the suggested flashing firmware versions that may be employed by the flashing application of FIGS. 3 and 4, in accordance with an embodiment presented herein.

DETAILED DESCRIPTION

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure relates generally to systems and methods for providing compatible firmware versions (e.g., cross-compatibility solution) for flashing different devices of a network of devices (e.g., an industrial automation system) when using a flashing application. Providing such a cross-compatibility solution may facilitate flashing the devices with compatible software or firmware, based on a topology of the network of devices, to prevent functional errors in the network of devices. The present systems and methods may also be applicable for determining and providing cross-compatibility solutions between different firmware, as well as software, used by different respective devices of a network of devices. That said, although embodiments described herein are with respect to providing cross-compatibility information (or solutions) for firmware associated with devices of a network, it should be appreciated that similar systems and methods may provide cross-compatibility information for software associated with devices of a network.

For example, a processing system may detect multiple communicatively coupled devices in a network of devices and a network topology of the communicatively coupled devices. The processing system may determine compatibility (or incompatibility) of different firmware versions associated with each device based on the network topology, different firmware versions used by other devices of the network, one or more user provided preferences, and so forth, as will be appreciated. In one example, cross-compatibility information for each device may be based on operations of the respective device and one or more other devices functionally co-dependent with the device based on the network topology. In some embodiments, the processing system may provide the cross-compatibility information via a graphical user interface. Accordingly, the processing system or a user may use the cross-compatibility information to select compatible firmware versions for implementation on respective devices (i.e., flashing the devices) based on the cross-compatibility information.

The network devices may each include similar or different circuitry to perform respective operations associated with the network in communication with other devices in the network. For example, devices may include various modules such as controllers, drivers, processors, or microprocessors, among other things, to perform specific operations. Moreover, multiple devices may use an implemented firmware to perform different operations in coordination with other devices. Moreover, such devices may use the implemented firmware to facilitate communication with other devices. However, based on the network topology, operations being performed, firmware versions being used, and/or other factors, different devices may be compatible with one or more other devices of the network only when using compatible firmware versions. For example, a first device may successfully perform an operation in communication with a second device of the network using a first version of firmware, whereas the first device may become incompatible with the second device for performing the operation when using a different version of the same firmware. Such incompatibility between different versions of firmware implemented on different devices may cause undesirable functional errors in the network.

With that in mind, a flashing application may facilitate identification of compatible firmware versions and flashing (programming or reprogramming) one or multiple devices of such network with a respective version of a device-specific firmware. In some embodiments, the flashing application may facilitate flashing multiple devices of the network simultaneously. However, as discussed above, implementing some versions of a firmware on a device may cause the device to be incompatible with other devices of the network. Accordingly, flashing a device with a firmware or a version of the firmware that may cause the device to be incompatible with one or more other devices may result in functional errors in the network. As such cross-compatibility information provided by the flashing application may allow for identification of one or more combinations of compatible firmware, selection of a combination of compatible firmware, and installation of the firmware on respective devices.

Systems and methods are described herein that may provide cross-compatibility information for devices within a network to facilitate flashing the devices with compatible firmware versions and prevent functional errors in the network. With respect to some embodiments of the present application, a flashing application may detect the devices of the network, a current firmware version implemented on the respective devices, and a network topology used for connection and communication between the devices of the network. In different embodiments, the flashing application may receive such information from the respective devices of the network, a control system of each of the respective devices, a central control system of the network including such information, etc.

Subsequently, the flashing application may receive version identifiers of different firmware versions associated with each of the devices. In one example, the flashing application may receive the version identifiers based on the detected currently implemented firmware versions. Moreover, the flashing application may also receive compatibility information of the firmware versions associated with each of the devices. For example, the flashing application may receive the compatibility information of the firmware versions based on the network topology. In some embodiments, the flashing application may receive the compatibility information from different compatibility information sources. For example, the flashing application may receive the compatibility information from an information repository (e.g., Internet, Memory Storage, etc.).

Based on receiving the compatibility information, the flashing application may determine the cross-compatibility information between the devices using the network topology. For example, the flashing application may use the network topology to determine functional dependency between different devices. As such, the flashing application may determine the cross-compatibility information associated with each of the devices based on the determined functional dependencies between different devices. Accordingly, such cross-compatibility information may indicate compatibility (or incompatibility) of different firmware versions associated with each of the devices based on the network topology.

As such, flashing the network devices with compatible firmware versions may facilitate operation and communication of the devices within the network. In one embodiment, the flashing application may provide the determined cross-compatibility information via a graphical user interface (GUI). As such, a user may select respective compatible firmware versions for flashing one or multiple devices of the network to facilitate operation and communication of the devices within the network. In another embodiment, the flashing application may automatically flash one or multiple devices of the network using the cross-compatibility information. Accordingly, the flashing application may facilitate selection of compatible firmware versions for flashing devices of a network based on the determined cross-compatibility information.

With the foregoing in mind, providing the cross-compatibility information of devices of an industrial automation system via the flashing application may allow a user to select and flash the devices with compatible firmware versions and prevent functional errors in the industrial automation system. Different implementation of the flashing application may provide different implementations of the cross-compatibility information. Some embodiments of such flashing application are described below with reference to FIGS. 1-6.

Figure 1:
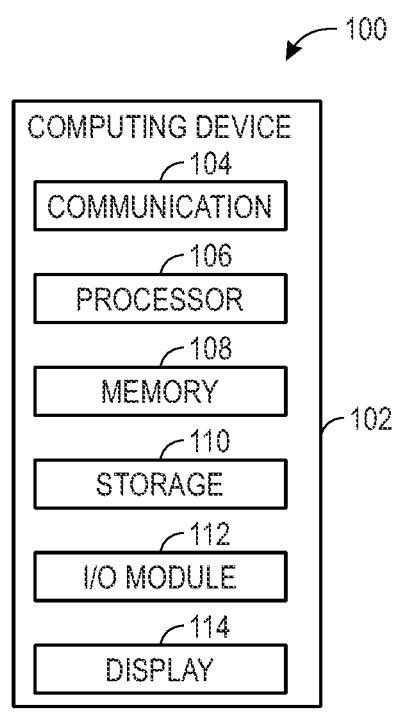
FIG. 1 illustrates a block diagram of components within a computing device of an industrial automation system, in accordance with an embodiment presented herein.

By way of introduction, FIG. 1 illustrates a block diagram 100 of components in a computing device 102 that may be used to perform the techniques described herein. An industrial automation system may be controlled by an industrial control system, such as the computing device 102. For example, the computing device 102 may determine and provide cross-compatibility information between multiple devices (e.g., components) of such industrial automation system and may allow flashing firmware or software to the multiple devices using a flashing application, as described above.

The computing device 102 may include, for example, a communication component 104, a processor 106, a memory 108, a storage 110, an input/output (I/O) module 112, which may include one or more I/O ports, a display 114 or other user interface, and the like. The communication component 104 may be a wireless or wired component that may facilitate communication between multiple components of the industrial automation system (e.g., via a network).

The communication component 104 may be a wireless or wired communication component that facilitates communication between the computing device 102 and other suitable devices of the industrial automation system via a network (e.g., a wired network, a wireless network, a local area network, a personal area network, a wide area network, a cellular network, etc.). The processor 106 may be any type of computer processor or microprocessor capable of executing computer-executable code. For example, the processor 106 may execute computer executable-code stored on the memory 108 to run the flashing application described above, as will be appreciated. The processor 106 may also include multiple processors that may perform the operations described below.

The memory 108 and the storage 110 may be any suitable articles of manufacture that can serve as media to store processor-executable code, data, or the like. These articles of manufacture may represent computer-readable media (i.e., any suitable form of memory or storage) that may store the processor-executable code used by the processor 106 to perform the presently disclosed techniques. As mentioned above, the memory 108 and/or the storage 110 may store processor-executable code associated with the flashing application used by the processor 106.

In some embodiments, the memory 108 may include a volatile data storage unit, such as a random-access memory (RAM) and the storage 110 may include a non-volatile data storage unit, such as a hard disk or solid state drive. The memory 108 and the storage 110 may also be used to store the data, data model, and the like. The memory 108 and the storage 110 may represent non-transitory computer-readable media (i.e., any suitable form of memory or storage) that may store the processor-executable code used by the processor 106 to perform various techniques described herein. It should be noted that non-transitory merely indicates that the media is tangible and not a signal.

The computing device 102 may also include an input/output (I/O) module 112. The I/O module 112 may enable the computing device 102 to communicate with various devices in the industrial automation system via the network. Moreover, the I/O module 112 may enable the computing device 102 to receive data from different devices within the industrial automation system. Such devices may include implemented firmware to perform specific functionality using the respective devices. The I/O module 112 may be interfaces that may couple to other peripheral components such as input devices (e.g., keyboard, mouse), sensors, input/output (I/O) modules, and the like.

In some embodiments, the computing device 102 may receive information indicative of the devices connected to the industrial automation system, current firmware versions implemented on the respective devices, and a network topology used for connection and communication between the devices of the industrial automation system via the I/O module 112. For example, the computing system 24 may receive such information via the I/O module 112 from a controller (e.g., control system) of the respective devices. The I/O module 112 may also enable the computing device 102 to receive compatibility information of different versions of firmware associated with each of the devices with respect to other devices based on the network topology. For example, the computing system 24 may receive the compatibility information via the I/O module 112 from an information repository.

The display 114 may operate to depict visualizations associated with software or executable code being processed by the processor 106. In one embodiment, the display 114 may be a touch display capable of receiving inputs from a user. For example, the display 114 may be any suitable type of display, such as a liquid crystal display (LCD), plasma display, or an organic light emitting diode (OLED) display. Additionally, in one embodiment, the display 114 may be provided in conjunction with a touch-sensitive mechanism (e.g., a touch screen) that may function as part of a control interface. In some embodiments, the display 114 may provide a GUI associated with the flashing application, as will be appreciated.

The display 114 may provide a user with information about the data received via the communication component 104. The information may include data received from different devices and may be associated with various sections of the industrial automation system. For example, the display 114 may provide a user with compatibility information or determined cross-compatibility information associated with the industrial automation system when using the flashing application. The display 114 may also be used by a user to provide input to the computing device 102, such as selecting compatible firmware versions for flashing based on the cross-compatibility information among other things.

It should be noted that the components described above with regard to the computing device 102 are by way of example and the computing device 102 may include additional or fewer components as shown. Although the block diagram 100 is depicted with respect to the computing device 102, it should be noted that the computing device 102 may be associated with any suitable computing system described herein. It also should be noted that, the computing device 102 or other suitable components may include all or some of the described components to perform the various techniques described herein.

Figure 2:
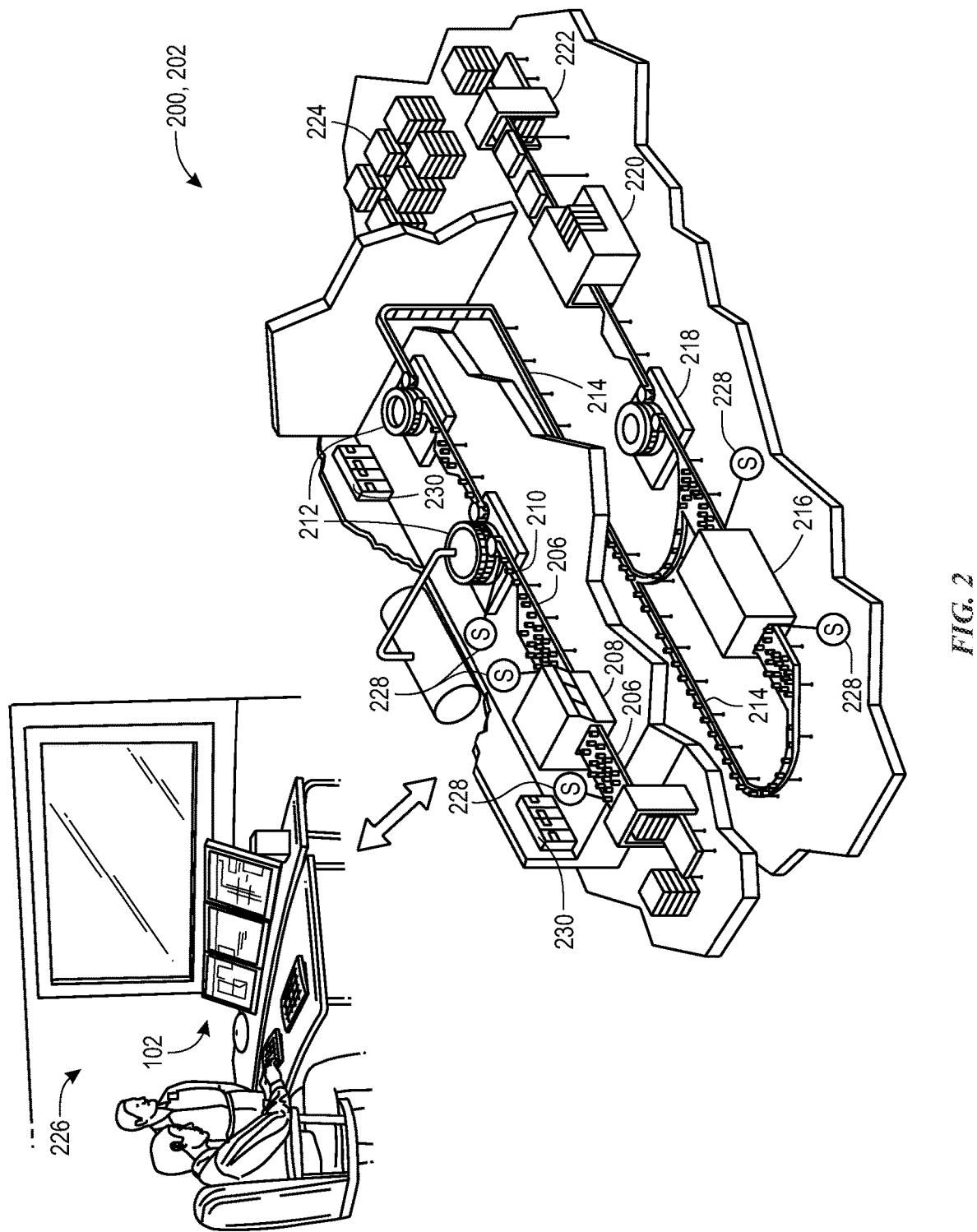
FIG. 2 illustrates an example factory employing the industrial automation system that includes the computing device of FIG. 1, in accordance with an embodiment presented herein.

An example industrial automation system 200 with respect to a factory 202 is depicted in FIG. 2. As illustrated in FIG. 2, the factory 202 may be an exemplary high-speed packaging line employed in the food and beverage industry that may process beverage containers (i.e., a beverage line). As such, the factory 202 may include industrial automation devices (i.e., devices) that, for example, may enable machine components to fill, label, package, or palletize containers, among other operations. Some of the devices may include implemented firmware to perform and/or control operations of a respective section of the factory 202. Although FIG. 2 illustrates a factory, it should be noted that the embodiments described herein are not limited for use with a factory. Instead, it should be understood that the embodiments described herein may be employed in a wide range of industrial automation environments.

As illustrated in FIG. 2, the factory 202 may include devices configured to conduct a particular function with respect to the packaging process. That is, each device (e.g., a control system of a device) may perform a respective operation of a respective section associated with the factory 202. Some devices may include implemented software and/or firmware to facilitate performing a respective operation of a respective section associated with the factory 202 by the respective devices.

For example, the packaging process begins at a loading station 204, where pallets of empty cans or bottles to be filled are fed into packaging factory 202 via a conveyor section 206. The conveyor section 206 transports the empty cans from the loading station 204 to a washing station 208, where the empty cans and bottles are washed and prepared for filling. As the washed cans and bottles exit the washing station 208, the conveyor section 206 may gradually transition into an aligning conveyor section 210, such that the washed cans and bottles enter a filling and sealing station 212 in a single-file line. The filling and sealing station 212 may function at an optimal rate when the washed cans and bottles enter the filling and sealing station 212 in a steady, uniform stream.

As the sealed cans exit the filling and sealing station 212, a buffering conveyor section 214 may hold the sealed cans to delay their entry into the next station. In addition, the buffering conveyor section 214 may transport the sealed cans in a single-file line so that the sealed cans arrive at a sterilization station 216 or a labeling station 218 at a desired time with the desired quantity of cans. Similar to the filling and sealing station 212, the packaging station 216 or the labeling station 218 functions efficiently when the buffering conveyor section 214 operates at optimal performance parameters (e.g., optimal speed, size, function, position/arrangement or quantity). After the cans and bottles have been sterilized and/or labeled, they are packaged into cases (e.g., 6-pack, 24-pack, etc.) at a packaging station 220, before they are palletized for transport at a station 222 or stored in a warehouse 224. It should be understood, however, for other applications, the particular system devices, the conveyors and their function will be different and specially adapted to the application.

As described above, some devices may include respective firmware implemented on a memory of such devices to perform the functions described above. However, using firmware versions with one or multiple devices of the factory 202 that are incompatible (e.g., functionally or communicatively incompatible) with one or multiple firmware versions used with other devices of the factory 202 may cause a functional error in the operations of the factory 202. For example, using incompatible firmware versions between different devices may cause erroneous communication between the devices or render one or more of the devices unable to perform assigned operations. As such, providing the cross-compatibility information to a user when flashing firmware (using the flashing application) on different devices may be beneficial to the factory 202 operations.

The factory 202 may also include the computing device 102, which may be located in a control room 226, distributed onto one or more devices 228, and/or the like. The devices 228 may include any type of control system and/or device, such as a pressure sensor, an accelerometer, a heat sensor, a motion sensor, a voltage sensor, and the like. The devices 228 may be located in various positions within the factory 202 and may measure a parameter value of interest relating to the beverage packaging process during the operation of the factory 202. For example, in certain embodiments, the devices 228 may include sensors configured to measure the rate of bottles or containers per minute (BPM) entering or leaving a machine component (i.e., stations 206, 208, 210, 216, 218, 220 or 222), or the rate of accumulation of bottles on a portion of a conveyor section (e.g., conveyor section 206 or 214). In general, any devices 228 capable of measuring a parameter value of interest relating to the beverage packaging process of the packaging factory 202 (e.g., rate, pressure, speed, accumulation, density, distance, position/arrangement, quantity, size, and so forth) may be used.

In some embodiments, the factory 202 may include a number of industrial automation power components 230 that may be used to control power used by various machine components in the factory 202. The power components 230 may also include different devices, such as drives, motors, inverters, switch gear, and the like, which may be used to operate a corresponding machine component. For example, the conveyor section 206 may rotate using a motor, which may be controlled via a power component 230, such as a variable frequency drive.

The power component 230 may include a device 228 that may monitor and control the operations of the respective power component 230. Referring back to the example above, the device 228 of the power component 230, such as the drive used to control the motor rotating the conveyor section 206, may monitor a voltage provided to the motor and may determine the speed at which the conveyor section 206 may be moving. In one embodiment, the device 228 of the power component 230 may send the data related to the speed of conveyor section 206 to the computing device 102, or to other control systems that may monitor and/or control other components of the factory 202. In this manner, the device 228 of the power component 230 may be aware of the operations of the power component 230 and may account for these operations when determining how its respective component should operate.

Keeping the factory 202 of FIG. 2 in mind, the devices 228 may be communicatively coupled to receive data from multiple other devices 228 dispersed throughout the factory 202. In some embodiments, the computing device 102 may run the flashing application to program or re-program one or multiple devices 228 with different versions of associated firmware. As mentioned above, the flashing application may receive information indicative of the multiple devices of the factory 202, a current firmware version implemented on each of the respective devices, a network topology of the factory 202, and compatibility information of different versions of firmware associated with each of the devices.

Subsequently, the flashing application may determine and provide the cross-compatibility information between the multiple devices based on the received information. As such, a user using the computing system 24 and the flashing application may make an informed decision when selecting compatible firmware versions when flashing the firmware associated with each of the devices. Although the embodiments herein are described with respect to compatibility of firmware of devices of the industrial automation system 200, it should be appreciated that similar systems and methods may facilitate providing compatibility information between different software or between different software and firmware used in the industrial automation system 200.

With the foregoing in mind, FIGS. 3 and 4 illustrate different embodiments of a flashing application 300, such as the flashing application described above, with respect to a GUI 302. The flashing application 300 may receive information associated with devices of a network (e.g., the industrial automation system 200), determine cross-compatibility information for the devices, and provide, via the GUI 302, suggested firmware versions for flashing one or multiple devices of the network via the flashing application 300. Moreover, the flashing application 300 may receive user preferences, or other parameters, via the GUI 302, for determining the suggested flashing firmware versions.

In one embodiment, the computing device 102 described with respect to FIGS. 1 and 2 may store and run the flashing application 300 and display the GUI 302 via the display 114. Moreover, the devices of the network may include the devices 228 described with respect to the industrial automation system 200 of FIG. 2, which may include some of the components shown and described with regard to FIG. 1.

Nevertheless, the embodiments of the flashing application 300 described herein are with respect to the embodiment of the GUI 302 depicted in FIG. 3. As such, it should be appreciated that in different embodiments, a different GUI may be displayed. The embodiments of the GUI 302 are described with respect to a single network of devices; however, it should also be appreciated that similar embodiments may include different implementations for multiple networks each including one or multiple devices.

Referring to the embodiment of FIG. 3, a flash devices tab 304 of the GUI 302 has been selected and is displayed. In different embodiments, a user may use a browsing path icon 306 of the GUI 302 to select or provide a network routing path. The network routing path may be associated with a target network of devices 308 (e.g., the factory 202) displayed via the GUI 302. As such, the computing device 102 may receive information associated with devices (e.g., devices 228 of FIG. 2) of the network using the network routing path.

In specific embodiments, the flashing application 300 may detect the network routing path based on pre-set settings. For example, the flashing application 300 may automatically determine the network routing path upon connection of a communication link to the computing system 24. Nevertheless, when the flashing application 300 is connected to the target network, the browsing path icon 306 may provide an indication of successful connection to the target network. Accordingly, the flashing application 300 may communicate with the devices of the network via the network routing path to receive the network information and/or flash devices of the network.

In one embodiment, the flashing application 300 may receive device identifiers 310, respective device addresses 312 (e.g., network address associated with each device), and currently implemented firmware versions 314 of each of the devices of the network, along with a network topology. The flashing application 300 may determine a firmware associated with each of the devices based on the received network information. Moreover, based on the determined firmware, the flashing application 300 may determine available firmware versions associated with each of the devices. In different embodiments, the flashing application 300 may display all detected devices or a selected assortment of the detected devices in the network of devices via the GUI 302.

The network topology may indicate functional dependencies between different devices of the network. For example, the network topology may indicate that operations of a first device depends on operations of a second device. That is, a firmware implemented on the first device may be functionally (or communicatively) dependent on a firmware implemented on the second device. As such, the first device may be flashed with a firmware that is compatible with a firmware being used for the second device. Accordingly, it may be desirable to determine compatible firmware versions of such devices before flashing the devices.

Referring back to the embodiment of FIG. 3, the GUI 302 may display a list 316 of the device identifiers 310 along with the respective device addresses 312, the currently implemented firmware versions 314, and a selected flashing firmware versions 318. The GUI 302 may also display information icons 320 for each of the devices. In specific embodiments, the flashing application 300 may provide additional information regarding a respective device, via the GUI 302, when the user selects or hovers a pointer over each of the information icons 320.

As described above, the flashing application 300 may receive one or multiple firmware version identifiers associated with different firmware versions of each of the devices. In some embodiment, the flashing application 300 may receive the firmware version identifiers based on the received network information, such as the device identifiers 310. Moreover, the flashing application 300 may receive the firmware version identifiers from an information repository (e.g., Internet, Product Compatibility and Download Center website, etc.).

The user may select a firmware version for flashing each device, via the GUI 302, from the respective firmware version identifiers associated with each device. The GUI 302 may display the selected flashing firmware version 318 associated with each respective device identifier 310. Moreover, based on the selected flashing firmware versions 318, the flashing application 300 may provide an incompatible icon 322 or a partially incompatible icon 324 along each of the incompatible selected flashing firmware versions 318. The flashing application 300 may determine that one or multiple selected flashing firmware versions 318 are incompatible with other network devices based on the received network information, as will be appreciated. Moreover, the flashing application 300 may use the selected flashing firmware version 318 of each device to flash the respective devices (e.g., program or reprogram the respective devices).

The information repository may also include compatibility information associated with different version identifiers (or different firmware versions) of each firmware associated with each of the devices. A connection icon 326 may indicate whether the computing device 102 and/or the flashing application 300 is connected to (or disconnected from) the information repository. The flashing application 300 may use the received compatibility information to determine the cross-compatibility information. The cross-compatibility information may indicate compatibility (or incompatibility) of each firmware version of each device with different firmware versions of other devices.

In one example, the flashing application 300 may use the received network topology to identify functionally dependent devices and determine the cross-compatibility information between such devices. To determine the cross-compatibility information, the flashing application 300 may compare compatibility of each version identifier of a firmware associated with each device, using the compatibility information, with different firmware version identifiers of one or multiple other devices. In the depicted embodiment, the flashing application 300 may provide the incompatible icon 322 and/or the partially incompatible icon 324, via the GUI 302, based on the determined cross-compatibility information. In alternative embodiments, the flashing application 300 may additionally or alternatively provide the cross-compatibility information, for example using a table, via the GUI 302.

Moreover, the flashing application 300 may provide selection boxes 328 associated with each of the devices. The user may use the selection boxes 328 to select a number of devices of the network. The flashing application 300 may provide the cross-compatibility information based on the user selected devices. As such, the flashing application 300 may determine the cross-compatibility information between the selected devices to provide the incompatible icon 322 or partially incompatible icon 324 based on the selected devices. Furthermore, the flashing application 300 may determine and provide suggested flashing firmware versions based on the selected devices.

The flashing application 300 may indicate incompatibility issues via the GUI 302. The GUI 302 may display the incompatible icon 322 for the devices with the selected flashing firmware versions 318 that are incompatible with the network. Moreover, the GUI 302 may display the partially incompatible icon 324 for the devices with the selected flashing firmware version 318 that are partially incompatible with the network. The partially incompatible firmware version is likely to be incompatible based on the cross-compatibility information. However, the incompatible firmware versions are determined to be incompatible based on the cross-compatibility information.

As depicted in the embodiment of FIG. 3, the flashing application 300 may provide additional information regarding the incompatibility status upon hovering a pointer over the incompatible icon 322 and the partially incompatible icon 324. In one embodiment, the flashing application 300 may display an alert, via the GUI 302, when the user selects a next icon 330 for proceeding to flash the devices without addressing the incompatibility issues. For example, the flashing application 300 may display a message via the GUI 302 indicative of incompatibility between the selected flashing firmware versions 318.

Nevertheless, the flashing application 300 may display a different compatibility status for each selected flashing firmware version 318 via the GUI 302. In some embodiments, multiple firmware versions associated with a device may be compatible for operation with other network devices. For example, based on receiving a user input, the flashing application 300 may determine a closest compatible firmware version or a latest compatible firmware version for each device. The closest compatible firmware version may be a compatible firmware version that is closest firmware version to the currently implemented firmware version 314 of a respective device. Moreover, the latest compatible firmware version may be the latest compatible firmware version of the compatible firmware versions associated with the respective device.

With the foregoing in mind, the user may select a preferred assortment of firmware versions for flashing one or more devices via the GUI 302. In the depicted embodiment, the user may use a compatible choices drop-down menu 332 to select between a closest compatible firmware versions 334 choice or a latest compatible firmware versions 336 choice. As discussed above, when the closest compatible firmware versions 334 is selected, the flashing application 300 may provide the suggested flashing firmware versions that are the closest compatible versions to the currently implemented firmware versions 314. When the latest compatible firmware versions 336 is selected, the flashing application 300 may provide the suggested flashing firmware versions that are the latest compatible versions.

In specific embodiments, the flashing application 300 may apply the suggested flashing firmware versions to the selected flashing firmware versions 318. For example, the user may select an "apply" or "ok" icon to apply the suggested flashing firmware versions to the selected flashing firmware versions 318. In other embodiments, the flashing application 300 may provide the suggested flashing firmware versions via the GUI 302. In such embodiments, the user may use the provided suggested flashing firmware versions to select the selected flashing firmware versions 318. The user may subsequently proceed with flashing one or multiple devices using the selected flashing firmware versions 318. The flashing application 300 may display a compatibility window including the selected flashing firmware versions 318 and/or the suggested flashing firmware version via a compatibility window. Such compatibility window is described below with respect to FIG. 4.

That said, the flashing application 300 may also provide a compatibility issues icon 338 via the GUI 302. The flashing application 300 may provide the compatibility window upon selection of the compatibility issues icon 338. The user may provide further instructions for determining the suggested flashing firmware versions and flashing the devices using compatible selected flashing firmware versions 318 via such compatibility window described with respect to FIG. 4.

The flashing application 300 may provide a download icon 340, via the GUI 302, associated with the selected flashing firmware versions 318 that are not stored on a memory associated with the flashing application 300. In some embodiments, such memory may include the memory 108 of the computing system 24. For example, the flashing application 300 may download the selected flashing firmware versions 318 (or all the available firmware versions associated with each device identifier 310) when the respective download icon 340 is selected and the flashing application 300 is connected to the information repository.

The flashing application 300 may include other tabs such as a manage favorites tab 342. The manage favorites tab 342 may include previously selected favorite devices. For example, the user may select favorite devices using a create favorite list icon 344 of the flash devices tab 304. Accordingly, in different embodiments, the manage favorite tab may display similar or different GUI as the GUI 302 of FIG. 3, using the selected favorite devices.

Referring now to FIG. 4, the GUI 302 may display a compatibility window 400, as described with respect to some aspects of FIG. 3. In some embodiments, the flashing application 300 may display the compatibility window 400 when the user selects the compatibility issues icon 338 described with respect to FIG. 3. In other embodiments, the flashing application 300 may provide the compatibility window 400 when the user selects the next icon 330 for proceeding to flash the devices without addressing the incompatibility issues. In some embodiments, the compatibility window 400 may be a pop-up window, as shown in FIG. 4. In other embodiments, the compatibility window 400 may be a new window or tab of the GUI 302.

In different embodiments, the compatibility window 400 may include a list 402 of device identifiers 310. The listed device identifiers 310 may correspond to the devices with compatibility issues, based on the selected flashing firmware versions 318, or the device identifiers 310 that are selected by the user using the selection boxes 328. In the depicted embodiment, the compatibility window 400 may include the list 402 of device identifiers 310 with compatibility issues based on the selected flashing firmware versions 318. The compatibility window 400 may also include a selectable revision lock 404 associated with each of the device identifiers 310 along with the respective currently implemented firmware version 314, the respective selected flashing firmware version 318, and a respective suggested flashing firmware version 406. The compatibility window 400 may also include the compatible choices drop-down menu 332.

As described above, the flashing application 300 may receive information including different firmware version identifiers associated with each of the listed device identifiers 310 and the respective compatibility information associated with different firmware version identifiers from the information repository. Subsequently, the flashing application 300 may determine the cross-compatibility information of different firmware versions of the listed device identifiers 310 based on the received information. Accordingly, the flashing application 300 may provide the suggested flashing firmware versions 406 based on the determined cross-compatibility information via the GUI 302. However, the user may provide preferred settings for determining the suggested flashing firmware version 406, as will be appreciated.

In some embodiments, the user may use the compatible choices drop-down menu 332 to select an assortment preference for the suggested flashing firmware versions 406. In the depicted embodiment, the user may select between the closest compatible firmware versions 334 or the latest compatible firmware versions 336 for determining the suggested flashing firmware versions 406. Accordingly, the flashing application 300 may determine the suggested flashing firmware versions 406 using the cross-compatibility information and based on the user preference provided via the compatible choices drop-down menu 332. In different embodiments, the suggested flashing firmware versions 406 may be similar to or different from the currently implemented firmware versions 314 and/or the selected flashing firmware versions 318. However, flashing the devices of the network using the suggested flashing firmware versions 406 may result in functional compatibility between the devices, thus preventing functional errors in the network.

In some embodiments, the user may use the selectable revision locks 404 to indicate additional preference for determining the suggested flashing firmware versions 406. For example, the user may select the selectable revision lock 404 of one or more of the device identifiers 310 to maintain the currently implemented firmware version 314 of the respective devices when flashing the network devices. In different embodiments, the user may select the selectable revision lock 404 of one or more of the devices to maintain the selected flashing firmware version 318 of the respective devices when flashing the network devices.

By the way of example, a particular firmware version of a network device may provide compatibility or functionality that subsequent firmware versions may not provide. Accordingly, the user may prefer to maintain such particular firmware version by using the respective selectable revision lock 404 associated with that particular firmware version for the device network. In another example, some firmware versions may cause errors in a respective device, the network, or both. As such, the user may use the selectable revision lock 404 to maintain a different firmware version for the respective device.

Accordingly, the flashing application 300 may determine and provide the suggested flashing firmware versions 406 associated with other listed device identifiers 310 of the compatibility window 400 based on user provided preferences using the selectable revision locks 404 and the compatible choices drop-down menu 332. That is, the flashing application 300 may determine and provide the suggested flashing firmware versions 406 based on maintaining the locked firmware versions and whether the closest compatible firmware versions 334 or the latest compatible firmware versions 336 is selected.

Subsequently, the user may proceed to use the flashing application 300 to flash the selected devices with compatible firmware versions using the suggested flashing firmware versions 406. In some embodiments, the user may apply the suggested flashing firmware versions 406 to the selected flashing firmware versions 318 using an apply icon 408 or an ok icon 410. In different embodiments, the user may use the suggested flashing firmware versions 406 to select the selected flashing firmware version 318. Subsequently, the user may proceed to use the flashing application 300 to flash one or multiple devices using the selected flashing firmware versions 318 by selecting the next icon 330. The user may also disregard the suggested flashing firmware versions 406 using a cancel icon 412. Nevertheless, flashing one or multiple devices of the network (e.g., the industrial automation system 200) using the suggested flashing firmware versions 406 may prevent functional errors between different devices of the network.

FIGS. 5A, 5B, and 5C depict respective portions of a flow chart of a process 500 for determining cross-compatibility information of firmware associated with devices of a network and providing suggested flashing firmware versions (e.g., the suggested flashing firmware versions 406). In some embodiments, a flashing application, such as the flashing application 300 of FIGS. 2 and 3, may perform the process 500. Moreover, in specific embodiments, the network of devices may be the industrial automation system 200 of FIG. 2 and/or the network of devices described with respect to FIGS. 3 and 4.

The flashing application may start the process 500 at block 502 by connecting to the devices of the network via the network routing path. At block 504, the flashing application may receive device identifiers of each network device along with the network topology. The flashing application may then receive firmware version identifiers of different firmware versions associated with each of the device identifiers at block 506. The flashing application may then receive compatibility information associated with each firmware version identifier at block 508 and store the received compatibility information at block 510.

As discussed above, the flashing application may receive the firmware version identifiers and the respective compatibility information from an information repository. As such, the flashing application may be connected to the information repository (e.g., connected to the Internet and/or the Product Compatibility and Download Center website) to receive the firmware version identifiers and the respective compatibility information. In specific embodiments, the flashing application may connect to the information repository, via a routing path associated with the information repository, before receiving the firmware version identifiers and the respective compatibility information.

Subsequently, the flashing application may receive user preferences for determining the suggested flashing firmware versions at block 512. In some embodiments, the flashing application may provide the GUI 302 described with respect to FIGS. 3 and 4 to receive the user preferences. For example, the user may provide user preferences, via the compatible choices drop-down menu 332, indicative of whether to suggest latest or closest compatible firmware versions for all or a selected assortment of the devices of the network. Moreover, the user may use the selectable revision locks 404 associated with one or more of the devices to lock one or multiple implemented firmware versions or selected flashing firmware versions 318.

FIG. 5B depicts a second portion of the flow chart of the process 500 for determining cross-compatibility information of firmware associated with devices of a network and providing suggested flashing firmware versions (e.g., the suggested flashing firmware versions 406). The flashing application may start a sub-process 514 to determine the suggested compatible firmware versions based on the received firmware version identifiers, the received compatibility information, and the received user preferences. The flashing application may use a first filter 516 to keep the relevant firmware version identifiers of each of the devices and remove the rest of firmware version identifiers. For example, the first filter 516 may remove irrelevant firmware version identifiers associated with each device, as will be appreciated.

At block 518, the flashing application may select a first device. The flashing application may then filter compatible firmware versions of the selected device based on the locked firmware versions. At decision block 520, the flashing application may determine whether the selected device is locked. The flashing application may proceed to block 522 when the selected device is locked. At the block 522, the flashing application may keep the firmware version identifier of the currently implemented firmware version. In different embodiments, the flashing application may keep the firmware version identifier of the selected firmware version instead of the currently implemented firmware version. Moreover, at the block 522, the flashing application may remove the rest of firmware version identifiers associated with the selected device. Subsequently, the flashing application may proceed to decision block 530. The operations associated with the decision block are described below.

Referring back to decision block 520, the flashing application may proceed to a decision block 524 when the selected device is not locked. At the decision block 524, the flashing application may determine whether the currently implemented firmware version is a compatible firmware version. The flashing application may refer to the received compatibility information and the network information to determine whether the currently implemented firmware version is a compatible firmware version. When the currently implemented firmware version is a compatible firmware version, the flashing application may proceed to block 526. At block 526, the flashing application may keep the firmware version identifier of the currently implemented firmware version and later firmware version identifiers of the selected device than the currently implemented firmware version. As such, the flashing application may keep the closest compatible firmware version and the latest compatible firmware version of the selected device for processing. Subsequently, the flashing application may proceed to the decision block 530.

Referring back to the decision block 524, the flashing application may proceed to operations of block 528 when the currently implemented firmware version is not a compatible firmware version. At the block 528, the flashing application may keep all the firmware version identifiers of the selected device for further processing. Subsequently, the flashing application may proceed to the decision block 530. At the decision block 530, the flashing application may determine whether all the firmware version identifiers of all the device identifiers are filtered using the first filter 516. If all the device identifiers are not filtered, the flashing application may proceed to block 532 to select a different (e.g., subsequent) device identifier and return to the block 520 to filter the firmware version identifiers associated with the subsequently selected device identifier. However, when all the firmware version identifiers of all the device identifiers are filtered using the first filter 516, the flashing application may proceed to a second filer 534.

FIG. 5C depicts a third portion of the flow chart of the process 500 for determining cross-compatibility information of firmware associated with devices of a network and providing suggested flashing firmware versions (e.g., the suggested flashing firmware versions 406). Referring now to operations of the second filter 534, at block 536, the flashing application may determine the cross-compatibility information based on the received firmware version identifiers from the first filter 516, the received compatibility information, and the network topology. In specific embodiments, as described above, the flashing application may determine the cross-compatibility information based on a functional dependency between the devices of the network. Subsequently, the flashing application may proceed to block 538 to keep the compatible firmware version identifiers of each device and remove the remaining firmware version identifiers based on the determined cross-compatibility information. As such, the flashing application may proceed a third filter 540.

At the third filter 540, the flashing application may run the operations described below on all the stored device identifiers individually. As such, at block 542, the flashing application may select a first device identifier. Subsequently, the flashing application may proceed to block 544 to aggregate compatible version identifiers to determine the suggested flashing firmware versions based on the received compatible firmware version identifiers and the determined cross-compatibility information. The flashing application may consider whether a closest or latest compatible firmware version is selected when determining the suggested firmware versions at the block 544. In some embodiments, the user may select between the closest compatible firmware version 334 and the latest compatible firmware version 336 via the compatible choices drop-down menu 332 of FIGS. 3 and 4. Moreover, in different embodiments, the flashing application may use different algorithm to aggregate the compatible version identifiers and determine the suggested flashing firmware versions.

While performing block 544, the flashing application may iteratively perform the operations of decision block 546. At the decision block 546, the flashing application may inquire whether the closest or latest compatible firmware version (based on the received user preference) is determined. When the closest or latest compatible firmware version is not determined, the flashing application may return to the block 544 to continue the respective operations and determine the closest or latest compatible firmware version for the selected device. However, when the closest or latest compatible firmware version of the selected device is determined, the flashing application may proceed to block 548.

At the block 548, the flashing application may return determined suggested flashing firmware version of the selected device. For example, the flashing application may store the determined suggested flashing firmware version of the selected device. Subsequently, the flashing application may proceed to decision block 550. At the decision block 550, the flashing application may determine whether the operation of the third filter is performed on all the device identifiers. Accordingly, when the compatible firmware versions of all the device identifiers are not filtered by the third filter 540, the flashing application may select a subsequent device identifier at block 552 and return to the block 544. As such the flashing application may perform the operations of the third filter 540 on the selected device associated with the subsequently selected device identifier.

However, when all the device identifiers are filtered using the third filter 540, the flashing application may finish the operations of the process at block 554. As such, the suggested flashing application for all the devices (associated with each of the device identifiers) are determined and returned. As described above with respect to the embodiments of FIG. 4, the flashing application may provide the suggested flashing firmware versions 406 by the compatibility window 400 of the GUI 302. Accordingly, the user may select or apply compatible firmware versions using the selected flashing firmware versions 318 to flash the devices of the network.

The disclosed techniques may provide compatibility solution for programming different devices of an industrial automation system when using a flashing application. The described solutions may prevent functional errors caused by flashing one or multiple devices of such industrial automation system with incompatible firmware. The described flashing application and the respective systems and methods may facilitate determining and applying compatible firmware versions for flashing devices of such industrial automation system which may prevent system errors while reducing a troubleshooting and programming (reprogramming) time of the respective devices. That is, the described components and methods may introduce a technical solution to a technical problem.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An industrial automation control system comprising:
   a processing component configured to communicatively couple to a plurality of automation devices wherein the processing component is configured to perform operations comprising:
      receiving automation device information identifying a plurality of firmware versions available to run on each of the plurality of automation devices;
      receiving firmware compatibility information indicative of compatibility between the plurality of available firmware versions;

determining, based on the firmware compatibility information, one or more sets of compatible firmware versions, wherein each of the one or more sets of compatible firmware versions comprises at least one respective firmware version to run on each of the plurality of automation devices while remaining compatible with each other;

presenting, via a graphical user interface (GUI), an indication of at least one of the one or more sets of compatible firmware versions;

receiving, via the GUI, an input indicative of a selection of a particular set of the one or more sets of compatible firmware versions; and providing, to each of the plurality of automation devices, a command to install the respective firmware version from the selected set of compatible firmware versions.

2. The industrial automation control system of claim 1, wherein the operations comprise receiving device topology information indicative of one or more functional relationships between two or more of the plurality of automation devices, wherein determining the one or more sets of compatible firmware versions is based on the firmware compatibility information and the device topology information.

3. The industrial automation control system of claim 1, wherein the automation device information comprises a firmware identifier and a version identifier for each of the plurality of firmware versions available to run on each of the plurality of automation devices.

4. The industrial automation control system of claim 3, wherein the operations comprise:
connecting to an information repository associated with an industrial automation system; and
receiving, from the information repository, the firmware identifiers and the version identifiers.

5. The industrial automation control system of claim 1, wherein the operations comprise receiving an input indicative of a selection of a particular available firmware version of the plurality of available firmware versions for a particular automation device of the plurality of automation devices before determining the one or more sets of compatible firmware versions.

6. The industrial automation control system of claim 5, wherein determining the one or more sets of compatible firmware versions is based on the firmware compatibility information and the selected particular firmware version for the particular automation device.

7. The industrial automation control system of claim 1, wherein the operations comprise determining a most recent firmware version of the plurality of firmware versions available to run on each of the plurality of automation devices.

8. The industrial automation control system of claim 7, wherein the one or more sets of compatible firmware versions comprises at least one most recent firmware version to install on at least one of the plurality of automation devices while remaining compatible with each other.

9. The system of claim 1, wherein the operations comprise:
receiving, via the GUI, one or more inputs indicative of preserving currently installed firmware versions for one or more respective automation devices of the plurality of automation devices; and
determining the one or more sets of compatible firmware versions based on preserving the currently installed firmware versions for the one or more respective automation devices.

10. A non-transitory computer readable medium comprising computer readable code executable by one or more processors to:
receive automation device information for a plurality of automation devices of an industrial automation system identifying a plurality of firmware versions available to run on each of the plurality of automation devices;
receive device topology information indicative of one or more functional relationships between two or more of the plurality of automation devices receive firmware compatibility information indicative of compatibility between the plurality of available firmware versions;
determine, based on the firmware compatibility information and the device topology information, one or more sets of compatible firmware versions, wherein each of the one or more sets of compatible firmware versions comprises at least one respective firmware version to run on each of the plurality of automation devices while remaining compatible with each other;
present, via a graphical user interface (GUI), an indication of at least one of the one or more sets of compatible firmware versions;
receive, via the GUI, an input indicative of a selection of a particular set of the one or more sets of firmware versions; and
provide, to each of the plurality of automation devices, a command to install the respective firmware version from the selected set of compatible firmware versions.

11. The non-transitory computer readable medium of claim 10, wherein the automation device information comprises a firmware identifier and a version identifier for each of the plurality of firmware versions available to run on each of the plurality of automation devices.

12. The non-transitory computer readable medium of claim 10, wherein the one or more processors are configured to:
connect to an information repository associated with an industrial automation system; and
receiving, from the information repository, the firmware identifiers and the version identifiers.

13. The non-transitory computer readable medium of claim 10, wherein the one or more processors are configures to receive an input indicative of a selection of a particular available firmware version of the plurality of available firmware versions for a particular automation device of the plurality of automation devices before determining the one or more sets of compatible firmware versions, wherein determining the one or more sets of compatible firmware versions is based on the firmware compatibility information and the selected particular firmware version for the particular automation device.

14. The non-transitory computer readable medium of claim 10, wherein the one or more processors are configured to determine a most recent firmware version of the plurality of firmware versions available to run on each of the plurality of automation devices, and wherein the one or more sets of compatible firmware versions comprises at least one most recent firmware version to run on one of the plurality of automation devices while remaining compatible with each other.

15. The non-transitory computer readable medium of claim 10, wherein the one or more processors are configures to:
receive, via the GUI, one or more inputs indicative of preserving currently installed firmware versions for one or more respective automation devices of the plurality of automation devices; and determine the one or more sets of compatible firmware versions based on preserving the currently installed firmware versions for the one or more respective automation devices.

16. A method comprising:

receiving, by processing circuitry communicatively coupled to a plurality of automation devices, automation device information identifying a plurality of firmware versions available to run on each of the plurality of automation devices;

receiving, by the processing circuitry, firmware compatibility information indicative of compatibility between the plurality of available firmware versions;

receiving, by the processing circuitry, a selection of a particular available firmware version of the plurality of available firmware versions for a particular automation device of the plurality of automation devices;

determining, by the processing circuitry, based on the firmware compatibility information and the selected particular firmware version for the particular automation device, one or more sets of compatible firmware versions, wherein each of the one or more sets of compatible firmware versions comprises at least one respective firmware version to run on each of the plurality of automation devices while remaining compatible with each other;

presenting, by the processing circuitry and via a graphical user interface (GUI), an indication of at least one of the one or more sets of compatible firmware versions;

receiving, by the processing circuitry and via the GUI, an input indicative of a selection of a particular set of the one or more sets of compatible firmware versions; and providing, by the processing circuitry, to each of the plurality of automation devices, a command to install the respective firmware version from the selected set of compatible firmware versions.

17. The method of claim 16, comprising receiving device topology information indicative of one or more functional relationships between two or more of the plurality of automation devices, wherein determining the one or more sets of compatible firmware versions is based on the firmware compatibility information and the device topology information.

18. The method of claim 16, wherein the automation device information comprises a firmware identifier and a version identifier for each of the plurality of firmware versions available to run on each of the plurality of automation devices, and wherein the method comprises:

connecting, by the processing circuitry, to an information repository associated with an industrial automation system; and receiving, by the processing circuitry and from the information repository, the firmware identifiers and the version identifiers.

19. The method of claim 16, wherein the processing circuitry are configured to determine a most recent firmware version of the plurality of firmware versions available to run on each of the plurality of automation devices, and wherein the one or more sets of compatible firmware versions comprises at least one most recent firmware version to run on one of the plurality of automation devices while remaining compatible with each other.

20. The method of claim 16, wherein the automation device information comprises a firmware identifier and a version identifier for each of the plurality of firmware versions available to run on each of the plurality of automation devices, wherein the method comprises:

connecting, via the processing circuitry, to an information repository associated with an industrial automation system; and receiving, via the processing circuitry and from the information repository, the firmware identifiers and the version identifiers.

\* \* \* \* \*